(12) United States Patent
Gretz (10) Patent No.: US 7,060,900 B1
(45) Date of Patent: Jun. 13, 2006

(54) SNAP ENGAGEMENT EECTRICAL FITTING WITH FLANGELESS CONNECTOR BODY

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/338,367

(22) Filed: Jan. 24, 2006

(51) Int. Cl.
*H02G 3/06* (2006.01)

(52) U.S. Cl. .............. 174/65 R; 174/65 G; 174/152 G; 439/92; 439/939; 16/2.1

(58) Field of Classification Search .............. 174/65 R, 174/65 G, 68.1, 68.3, 152 G, 153 G, 151; 16/2.1, 2.2; 248/56, 49; 439/535, 538, 94, 439/95, 96, 101, 108, 609, 939, 604, 587, 439/274, 275, 557, 552, 142, 92
See application file for complete search history.

(56) References Cited

U.S. PATENT DOCUMENTS

| | | | |
|---|---|---|---|
| 5,171,164 A | 12/1992 | O'Neil et al. | |
| 5,266,050 A | 11/1993 | O'Neil et al. | |
| 6,380,483 B1 | 4/2002 | Blake | |
| 6,596,939 B1 * | 7/2003 | Gretz | 174/65 R |
| 6,768,057 B1 | 7/2004 | Blake | |
| 6,860,758 B1 * | 3/2005 | Kiely | 174/65 R |
| 6,916,988 B1 | 7/2005 | Auray et al. | |
| 6,935,891 B1 * | 8/2005 | Kiely | 439/535 |
| 6,957,968 B1 * | 10/2005 | Gretz | 174/65 R |

* cited by examiner

*Primary Examiner*—Angel R. Estrada (57) ABSTRACT

A snap engagement electrical fitting for securing electrical cables or conduit to an electrical panel or junction box. The fitting features a flangeless tubular connector body having a snap fit retaining ring surrounding its leading end. The connector body and snap fit retaining ring are electrically conductive. The snap ring includes an inward directed retainer tang for securing the snap ring to the connector body. One or more tangs are cantilevered outwards radially from the snap ring and include locking tangs and grounding tangs. The locking tangs snap engage and lock the electric connector assembly to a knock out in a panel or junction box when it is pressed therein and provide strain relief to prevent easy withdrawal of the connector therefrom. The grounding tangs establish good electrical continuity or ground between the connector assembly and the panel or junction box when it is connected thereto. The connector body is flangeless to reduce cost of construction. The grounding tang includes an integral leg portion that is bent outwards from the main body of the grounding tang to provide extensive surface contact between the grounding tang and the panel or junction box to establish good electrical continuity and reduce the millivolt drop between the electric connector assembly, the cable, and the junction box.

4 Claims, 7 Drawing Sheets

SNAP ENGAGEMENT ELECTRICAL FITTING WITH FLANGELESS CONNECTOR BODY

FIELD OF THE INVENTION

This invention relates to fittings for connecting electrical cables to a panel and specifically to an improved snap engagement electrical fitting that includes a connector body and snap retaining ring that establishes improved electrical continuity with the panel.

BACKGROUND OF THE INVENTION

Recently, snap fitting connectors have become popular as a means of connecting cables to electrical junction boxes. One such type of snap fitting is disclosed in U.S. Pat. No. 6,709,280 (hereinafter the '280 patent), issued Mar. 23, 2004 and incorporated in its entirety herein by reference. The snap fitting improved the functionality of the quick connect fitting by providing a snap ring with a grounding tang of a novel design that provided a tighter fit between the quick connect fitting and the junction box or panel that it connected to. The snap fitting of the '280 patent therefore improved the electrical continuity and lowered the millivolt drop between the fitting, the cable, and the junction box.

An improved snap engagement fitting was disclosed in U.S. Pat. No. 6,780,029 (hereinafter the '029 patent), issued Aug. 24, 2004 and incorporated in its entirety herein by reference. The fitting of the '029 patent improved the continuity of the snap engagement fitting by providing a snap ring including a locking tang lanced out of the grounding tang. By lancing the locking tang out of the grounding tang, a greater portion of the outer periphery of the snap ring is available for forming the grounding tang. The larger grounding tangs provide more contact between the junction box and the snap ring thereby providing improved electrical continuity and a lower millivolt drop between the fitting, the cable, and the junction box.

An improved snap engagement fitting was disclosed in U.S. Pat. No. 6,957,968 (hereinafter the '968 patent), issued Oct. 25, 2005 and incorporated in its entirety herein by reference. The fitting of the '968 patent included a flangeless connector body, which reduced the complexity and manufacturing cost of the connector body portion of the snap engagement fitting.

As described above, the snap engagement fittings of the '280 patent and the '029 patent improved the electrical continuity of snap engagement fittings and the fitting of the '968 patent provided a flangeless connector body to reduce the cost and complexity of the connector body of snap engagement fittings. The present invention combines the benefits of the aforementioned patents by providing a snap engagement fitting having improved electrical continuity and a simple, easily manufactured and low cost connector body.

These and other advantages will become apparent by reading the attached specification and claims in conjunction with reference to the attached drawings.

SUMMARY OF THE INVENTION

The present invention is an electric connector assembly for snap engagement of electrical cables or conduit to an electrical panel or junction box. The fitting features a flangeless tubular connector body having a snap fit retaining ring surrounding its leading end. The connector body and snap fit retaining ring are electrically conductive. The snap ring includes an inward directed retainer tang for securing the snap ring to the connector body. One or more tangs are cantilevered outwards radially from the snap ring and include locking tangs and grounding tangs. The locking tangs snap engage and lock the electric connector assembly to a knock out in a panel or junction box when it is pressed therein and provide strain relief to prevent easy withdrawal of the connector therefrom. The grounding tangs establish good electrical continuity or ground between the connector assembly and the panel or junction box when it is connected thereto. The connector body is flangeless to reduce cost of construction. The grounding tang includes an integral leg portion that is bent outwards from the main body of the grounding tang to provide extensive surface contact between the grounding tang and the panel or junction box to establish good electrical continuity and reduce the millivolt drop between the electric connector assembly, the cable, and the junction box.

OBJECTS AND ADVANTAGES

Several advantages are achieved with the electric connector assembly of the present invention, including:

The connector body portion of the electric connector assembly is flangeless to simplify manufacturing and reduce its production cost.

The connector body does not require flanges or outward projecting lugs to grip and retain a snap fit retaining ring.

The grounding tangs establish good electrical continuity or grounding between the connector assembly and the panel or junction box when it is connected thereto.

These and other objects and advantages of the present invention will be better understood by reading the following description along with reference to the drawings.

| 22) INDEX TO REFERENCE NUMERALS IN DRAWINGS | |
|---|---|
| 20 | snap engagement electrical fitting |
| 22 | connector body |
| 24 | leading end portion of connector body |
| 26 | trailing end portion of connector body |
| 28 | internal bore |
| 29 | opening in leading end portion of connector body |
| 30 | outlet opening |
| 31 | outer surface of leading end portion |
| 32 | snap fit retaining ring |
| 34 | blank |
| 36 | center opening |
| 38 | face portion |
| 40 | arm |
| 42 | locking tang |
| 44 | grounding tang |
| 44A | first pair of grounding tangs |
| 44B | second pair of grounding tangs |
| 46 | retaining tab |
| 48 | U-shaped opening |
| 50 | retaining tang |
| 52 | forward extending lip |
| 54 | annular surface |
| 56 | leading end of snap fit retaining ring |
| 58 | trailing end of snap fit retaining ring |
| 59 | leg portion of grounding tang |
| 60 | hole in panel |
| 62 | panel |
| 64 | annular surface |
| 66 | outer wall of panel |
| 68 | opening in trailing end portion of connector body |
| θ1 | angle between grounding tang and face portion |
| θ2 | angle between grounding tang and leg portion |
| D1 | diameter of the trailing end of snap fit retaining ring |
| D2 | diameter of the leading end of snap fit retaining ring |

DETAILED DESCRIPTION OF THE INVENTION

The present invention comprises an electrically conductive connector assembly for easy snap engagement of an electrical cable or an electrical conduit to an electrical panel or electrical junction box. Once connected into a hole in the panel or junction box, electrical continuity or grounding is provided between the fitting, an inserted cable or conduit, and the panel or junction box.

Figure 1:
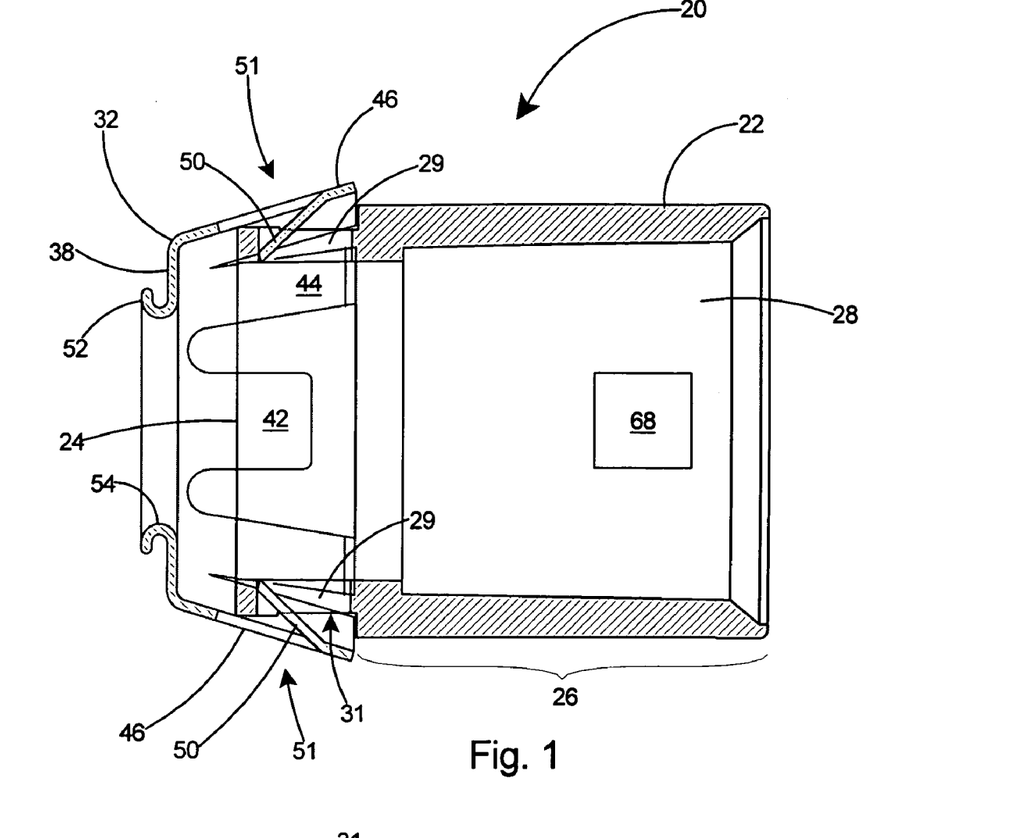
FIG. 1 is a conceptual sectional view of the preferred embodiment of a snap engagement connector assembly according to the present invention.

Referring to FIG. 1, there is shown a snap engagement connector assembly 20 for securing an electrical cable or conduit (not shown) to a panel or electrical box (not shown). The connector assembly 20 includes a connector body 22 having a leading end portion 24, a trailing end portion 26, and an internal bore 28.

Figure 1A:
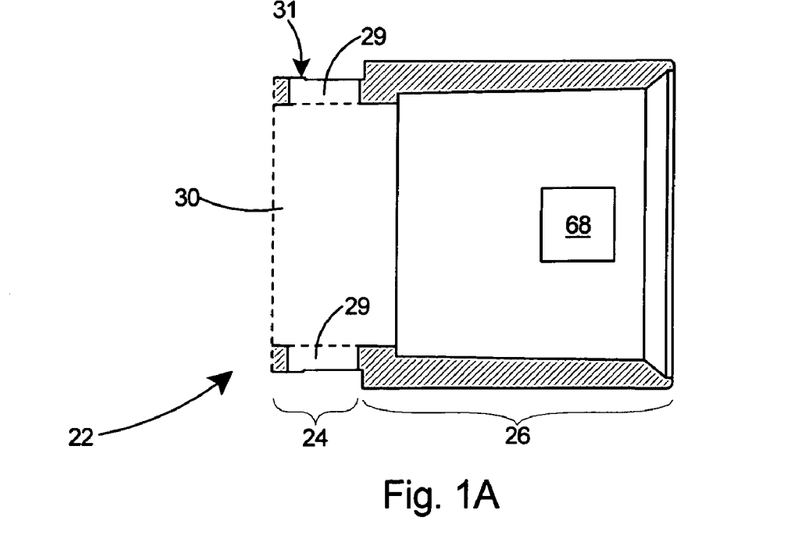
FIG. 1A is a sectional view of the connector body portion of the snap engagement connector assembly of FIG. 1.

With reference to FIG. 1A, the leading end portion 24 of the connector body 22 is cylindrical. The leading end portion 24 of the connector body 22 includes one or more openings 29 therein and terminates in an outlet opening 30. The leading end portion 24 further includes an outer surface 31 that is at a constant slope from the trailing end portion 26 to the outlet opening 30. The connector body 22 may be flangeless as shown and is typically die-cast from metals such as zinc, aluminum, and magnesium or alloys of these metals. As shown in FIG. 1, a snap fit retaining ring 32 is secured to the connector body 22 to form the snap engagement connector assembly 20 of the present invention.

Figure 2:
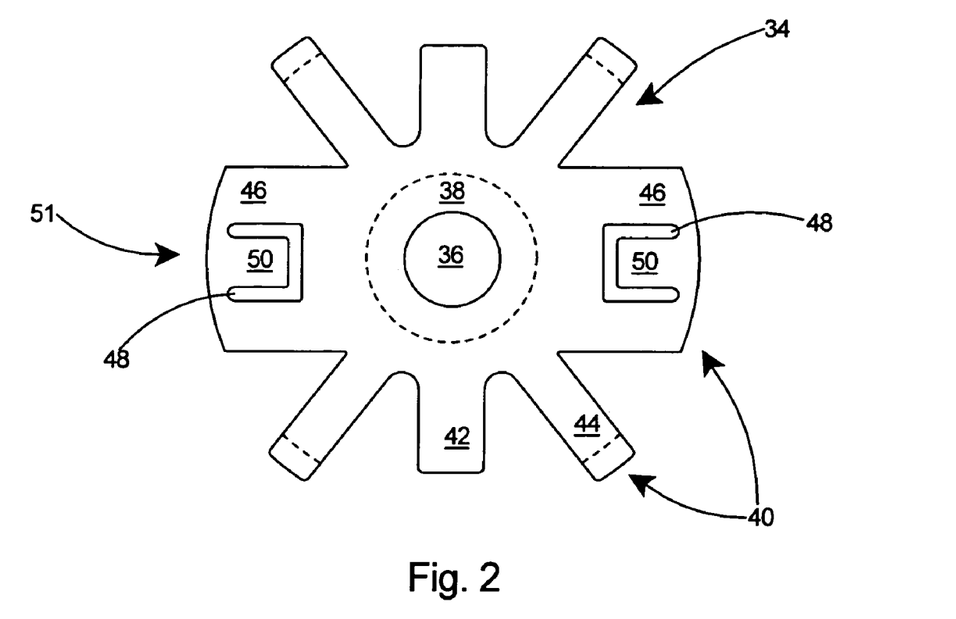
FIG. 2 is a plan view of a blank that has been stamped out and will be formed into the snap fit retaining ring of the present invention.

With reference to FIG. 2, the snap fit retaining ring is formed from a blank 34, which is typically stamped from a metal sheet. The blank 34 includes a center opening 36, a face portion 38 surrounding the center opening 36, and several arms 40 of varying shapes that, once formed into the desired frusto-conical configuration, will function as locking tangs 42, grounding tangs 44, and retaining tabs 46. U-shaped openings 48 formed in the retaining tabs 46 define portions that will function as retaining tangs 50 in the final frusto-conical configuration.

Figure 3:
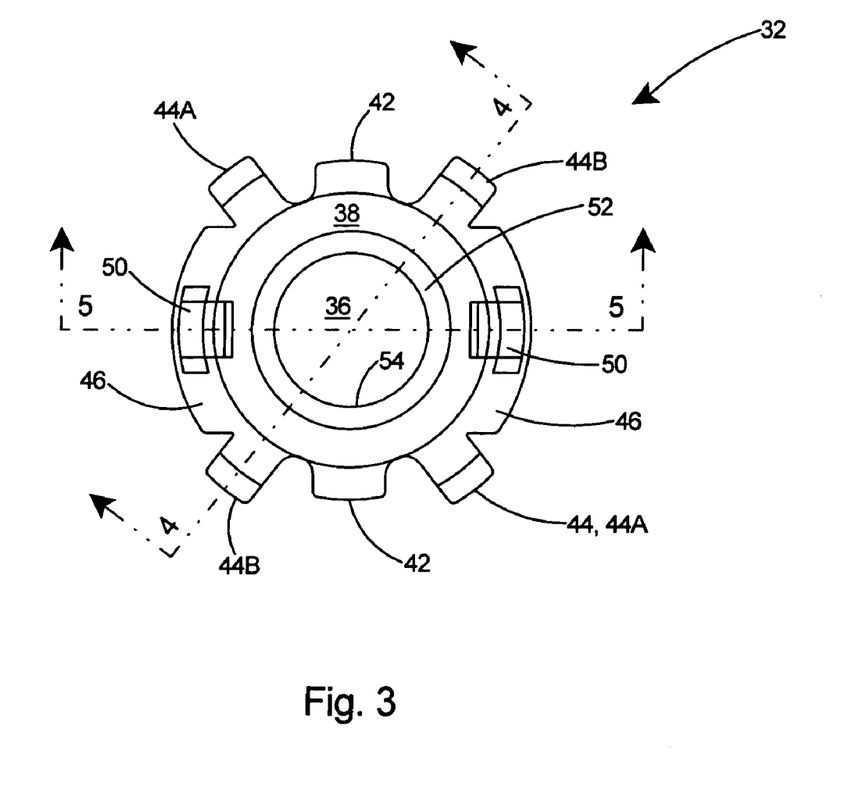
FIG. 3 is a plan view of a preferred embodiment of a snap fit retaining ring according to the present invention.

Once formed into the frusto-conical configuration, as shown in FIG. 3, the locking tangs 42, grounding tangs 44, and retaining tabs 46 all extend backwards from the face portion 38 thereby forming the frusto-conical shaped snap fit retaining ring 32. The locking tangs 42, the grounding tangs 44, and the retaining tabs 46 are all bent outward radially at substantially the same angle from the face portion 38 of the snap fit retaining ring 32 to form a relatively uniform frusto-conical configuration. Additionally, a forward extending lip 52 is rolled outwards away from the face portion 38 to form a smooth annular surface 54 at the center opening 36. As shown in FIG. 1, the retaining tangs 50 form a securing arrangement 51 for securing the snap fit retaining ring 32 onto the leading end portion 24 of the connector body 22.

Figure 4:
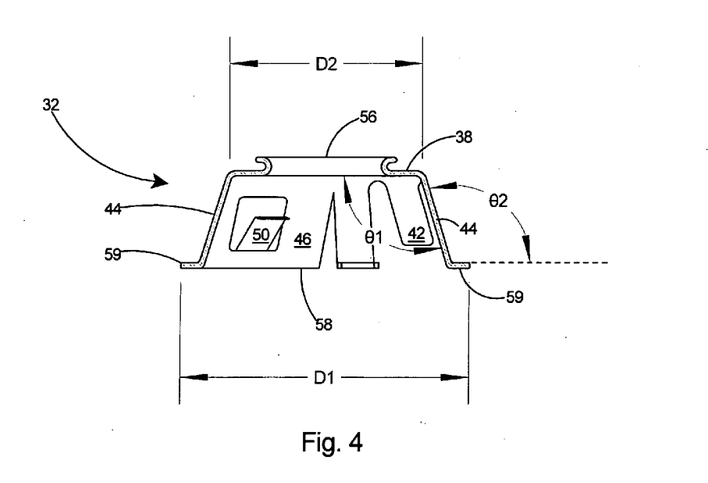
FIG. 4 is a sectional view of the snap fit retaining ring taken along line 4—4 of FIG. 3.

Referring to FIG. 4, the snap fit retaining ring 32 thus formed into the frusto-conical configuration includes a leading end 56 and a trailing end 58. It should be noted that, throughout this specification, the term leading end refers to the end that will face the panel or junction box (not shown) when ready to be connected thereto, and the trailing end refers to the end away from the panel or junction box. As shown in FIG. 4, the diameter D1 of the trailing end 58 of the frusto-conical configuration is greater than the diameter D2 of the leading end 56. The locking tangs 42, grounding tangs 44, and retaining tabs 46 are all cantileverly bent outwards at approximately the same angle from the face portion 38 and extend backwards from the face portion 38 thereby forming the frusto-conical shaped snap fit retaining ring 32.

Figure 5:
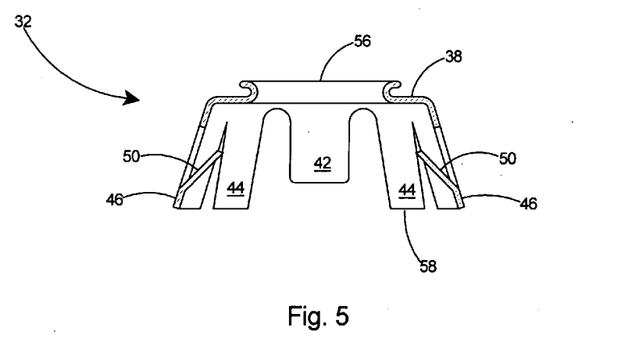
FIG. 5 is a sectional view of the snap fit retaining ring taken along line 5—5 FIG. 3.

With reference to the sectional view of the snap fit retaining ring 32 in FIG. 5, the locking tangs 42, grounding tangs 44, and a retaining tabs 46 are all formed or bent outward radially of and cantilevered from the snap fit retaining ring 32. The retaining tangs 50 are formed or bent inward radially of the retaining tabs 46.

As shown in FIG. 4, the grounding tangs 44 extend at a first angle θ1 from the face portion 38 of the snap fit retaining ring 32 and include integral leg portions 59. The leg portions 59 are bent outward at an angle θ2 from the grounding tangs 44. Preferably, the angle θ2 of the leg portion 59 with respect to the grounding tang 44 is between 100 and 115 degrees.

With reference to FIG. 1, the snap fit retaining ring 32, which is formed of a resilient metal such as spring steel, is pressed over the connector body 22 until the retaining tangs 50 of the securing arrangement 51 snap into the openings 29 on the leading end portion 24 of the connector body 22 thereby forming the snap engagement connector assembly 20 of the present invention. When pressing the snap fit retaining ring 32 onto the connector body 22, the retaining tabs 46 and retaining tangs 50 of the securing arrangement 51 are at first biased outwardly by the leading end portion 24 but then snap inwardly as the retaining tangs 50 snap into the openings 29. With the retaining tangs 50 seated in the openings 29, the snap fit retaining ring 32 is securely fastened to the connector body 22 to form the snap engagement connector assembly 20.

Figure 6:
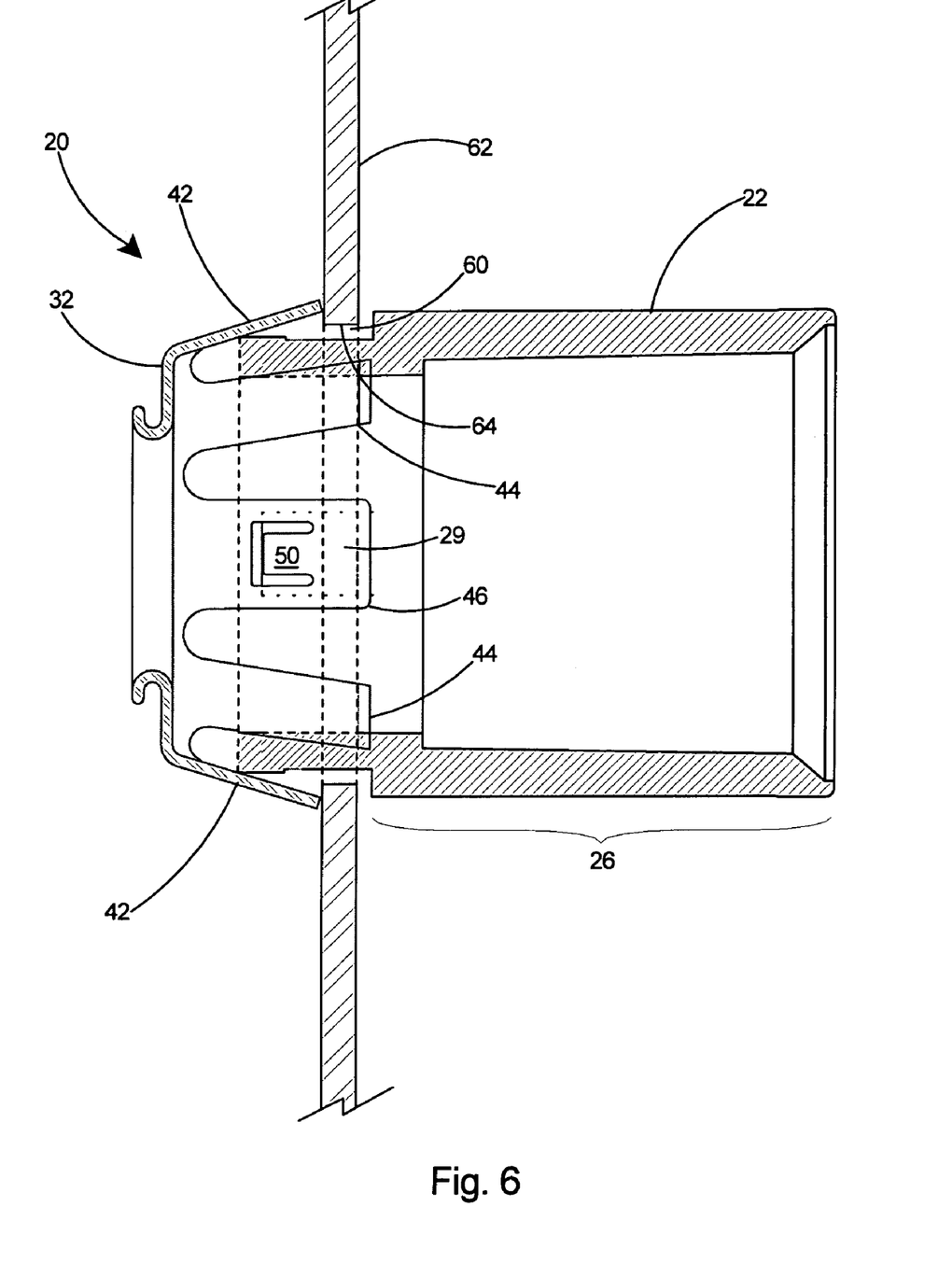
FIG. 6 is a sectional view of the snap engagement connector assembly installed in an electrical panel and taken along line 6—6 of FIG. 9.
Figure 7:
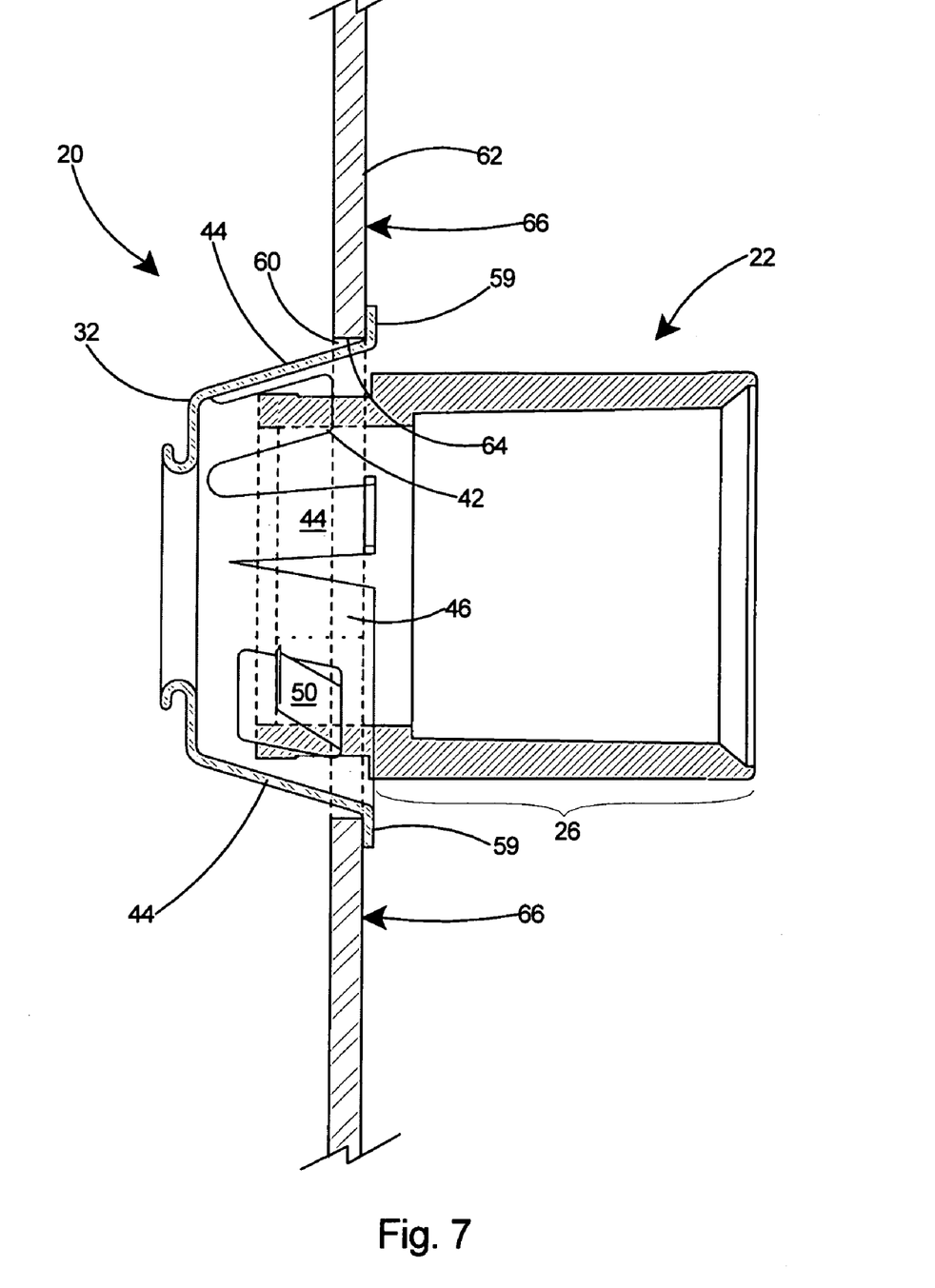
FIG. 7 is a sectional view of the snap engagement connector assembly installed in an electrical panel and taken along line 7—7 of FIG. 9.
Figure 8:
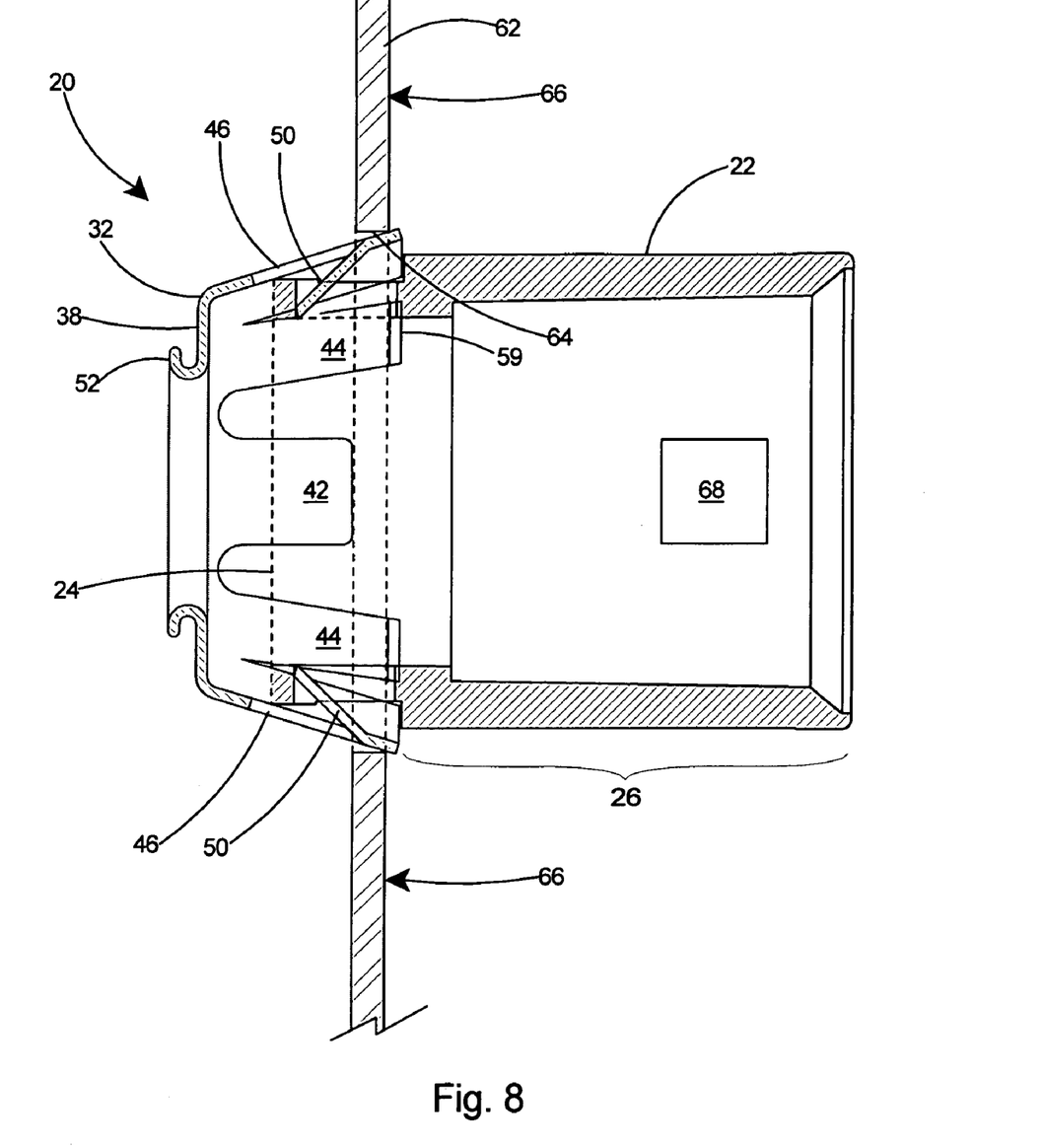
FIG. 8 is a sectional view of the snap engagement connector assembly installed in an electrical panel and taken along line 8—8 of FIG. 9.
Figure 9:
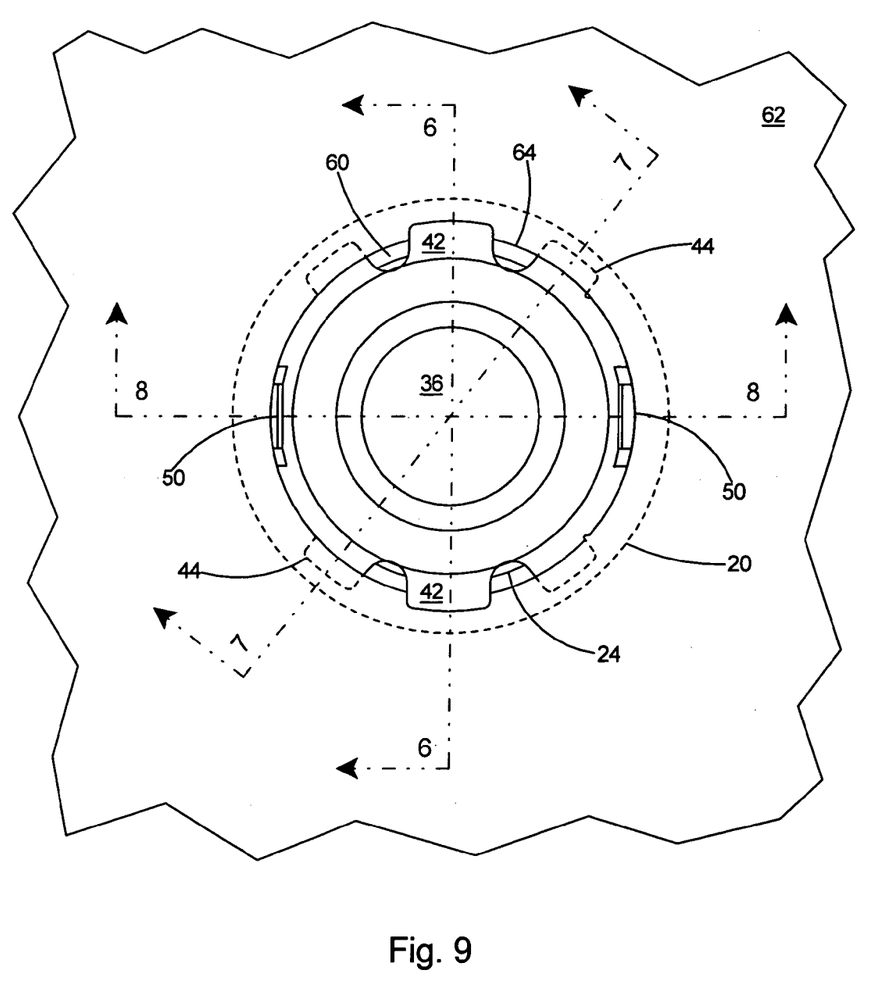
FIG. 9 is an end view of the snap engagement connector assembly of FIG. 1 installed into a hole in an electrical panel as viewed from the interior of the electrical panel.

Referring to FIG. 9, an end view is shown of the snap engagement connector assembly 20 of FIG. 1 installed into a hole 60 in an electrical panel 62 as viewed from the interior of the electrical panel. FIGS. 6–8 will depict sectional views of the snap engagement connector assembly 20 taken along separate lines to illustrate the operation of the connector assembly 20 and its various features.

Referring to FIG. 6, the snap engagement connector assembly 20 is used to connect electrical cable or conduit (not shown) to a panel or junction box. FIG. 6 depicts the snap engagement connector assembly 20 after it has been inserted through a hole 60 in a panel 62. As the connector assembly 20 is pressed into the hole 60, the locking tangs 42 are deflected inwardly by the annular surface 64 surrounding the hole 60. After the locking tangs 42 have cleared the annular surface 64, the locking tangs 42 snap outwardly to their original unbiased positions, thereby locking the snap engagement connector assembly 20 into the panel 62.

FIG. 7 depicts the snap engagement connector assembly 20 secured to the panel 62, but with the sectional view taken from another perspective, with the grounding tangs 44 in view. With the connector assembly 20 fully inserted into the hole 60 and secured to the panel 62 by the locking tangs 42, the grounding tangs 44 are biased against the annular surface 64 and the leg portions 59 of the grounding tangs 44 are held flush against the outer wall 66. As the snap fit retaining ring 32 is typically constructed of spring steel and the connector body 22 is typically constructed of electrically conductive metal, the grounding tangs 44 and their leg portions 59 provide extensive surface contact and therefore excellent electrical continuity or grounding between the panel 62, the snap engagement connector assembly 20, and any cable (not shown) secured to the trailing end portion 26 of the connector body.

With reference to FIG. 8, the snap engagement connector assembly 20 is shown secured to the panel 62, but with the sectional view taken from another perspective, with the retaining tabs 46 and retaining tangs 50 in view. With the locking tangs 42 securing the snap engagement connector assembly 20 to the panel 62 and thereby biasing the grounding tangs 44 against the outer wall 66 of the panel 62, the retaining tangs 50 establish further contact with the annular surface 64 and hold the snap fit retaining ring 32 securely to the connector body 22.

An electrical cable or electrical conduit may be secured to the trailing end portion 26 of the snap engagement electrical assembly 20 by a cable securing arrangement for the trailing end of a tubular connector such as the spring steel locking ring described in U.S. Pat. No. 6,080,93.3, the spring steel adapter of U.S. Pat. No. 6,604,400, and the split ring of U.S. Pat. No. 6,670,553, all of which patents are incorporated herein by reference in their entireties. As shown in FIG. 8, an opening 68 is provided in the trailing end portion 26 of the connector body 22 to allow a resilient split ring (not shown) to be secured therein. The split ring (not shown) enables easy snap in connection of cables or conduits as described in the incorporated references.

Referring to FIG. 3, the preferred embodiment of the snap fit retaining ring 32 preferably includes two locking tangs 42 arranged approximately 180 degrees apart on the ring. The preferred embodiment includes four grounding tangs 44 with a first pair 44A of the grounding tangs arranged diametrically opposed from each other across the frusto-conical configuration and a second pair 44B of the grounding tangs arranged diametrically opposed from each other and offset from the first pair of the grounding tangs. The preferred embodiment of the snap fit retaining ring 32 further includes two retaining tabs 46 with the retaining tabs 46 and their associated retaining tangs 50 arranged diametrically opposed across the frusto-conical configuration of the retaining ring 32.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A snap engagement connector assembly for securing an electrical cable or conduit to an electrical box comprising:
   a connector body having a leading end portion, a trailing end portion, and a bore extending therethrough;
   said leading end portion terminating in an outlet opening for insertion through a hole in said electrical box;
   a snap fit retaining ring having a face portion and a circumscribing frusto-conical configuration;
   said snap fit retaining ring having a leading end and a trailing end;
   said leading end of said snap fit retaining ring having a diameter;
   said trailing end of said snap fit retaining ring having a diameter wherein said diameter of said trailing end of said snap fit retaining ring is greater than said diameter of said leading end of said snap fit retaining ring;
   a locking tang on said snap fit retaining ring;
   a grounding tang extending at a first angle from said face portion of said snap fit retaining ring;
   said grounding tang including an integral leg portion bent outward at an angle from said grounding tang;
   a retaining tab on said snap fit retaining ring;
   said locking tang, said grounding tang, and said retaining tab bent outward radially from said face portion of said snap fit retaining ring; and
   an arrangement for securing said snap fit retaining ring onto said leading end portion of said connector body.

2. The snap engagement connector assembly of claim 1 wherein said angle of said leg portion of said grounding tang with respect to said grounding tang is between 100 and 115 degrees.

3. The snap engagement connector assembly of claim 1 wherein said retainer tab includes
   a U-shaped cut therein; and
   a retainer tang formed by said U-shaped cut and bent inward radially of said snap fit retaining ring having said frusto-conical configuration.

4. The snap engagement connector assembly of claim 3 wherein said arrangement for securing said snap fit retaining ring onto said leading end portion of said connector body includes an opening on said leading end portion of said connector body for receiving said inward bent retainer tang of said snap fit retaining ring.

* * * * *